F. A. HART.
COMBINED TYPE WRITING AND COMPUTING MACHINE.
APPLICATION FILED SEPT. 18, 1911.
1,254,627.
Patented Jan. 22, 1918.
3 SHEETS—SHEET 3.
FIG. 6.
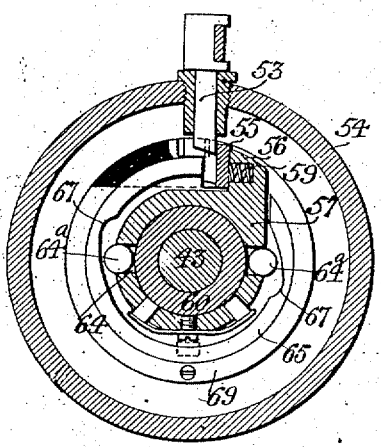
FIG. 8.
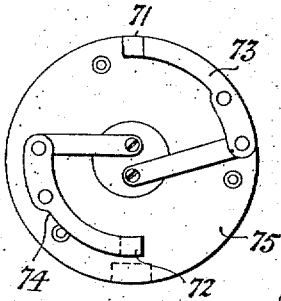
FIG. 7.
FIG. 9.
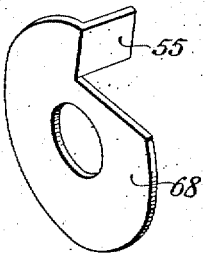
FIG. 4.
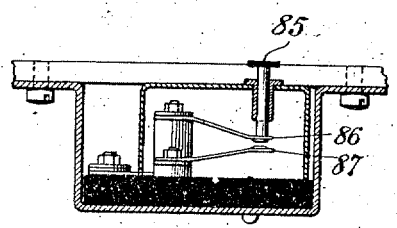
FIG. 3.
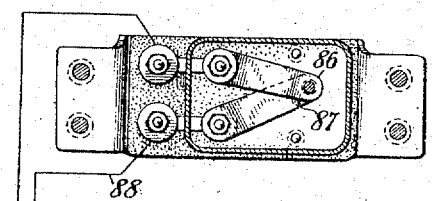
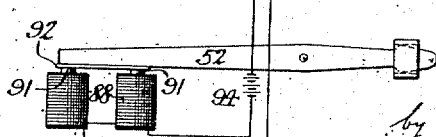
Witnesses:
J. A. Brophy
F. D. Smith
Inventor:
Frederick A. Hart
by B. C. Stickney
his Attorney

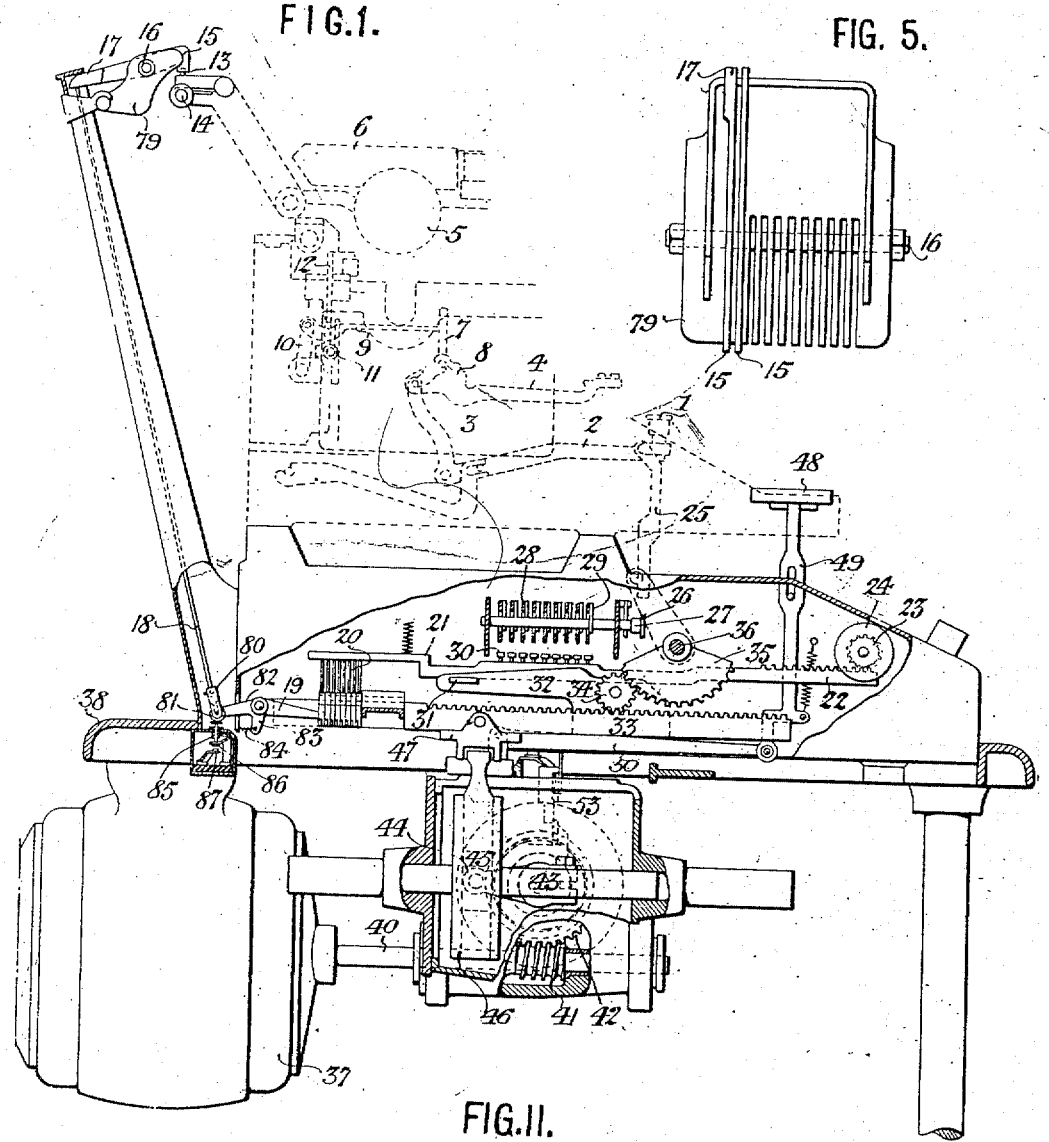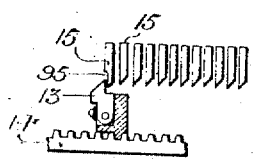

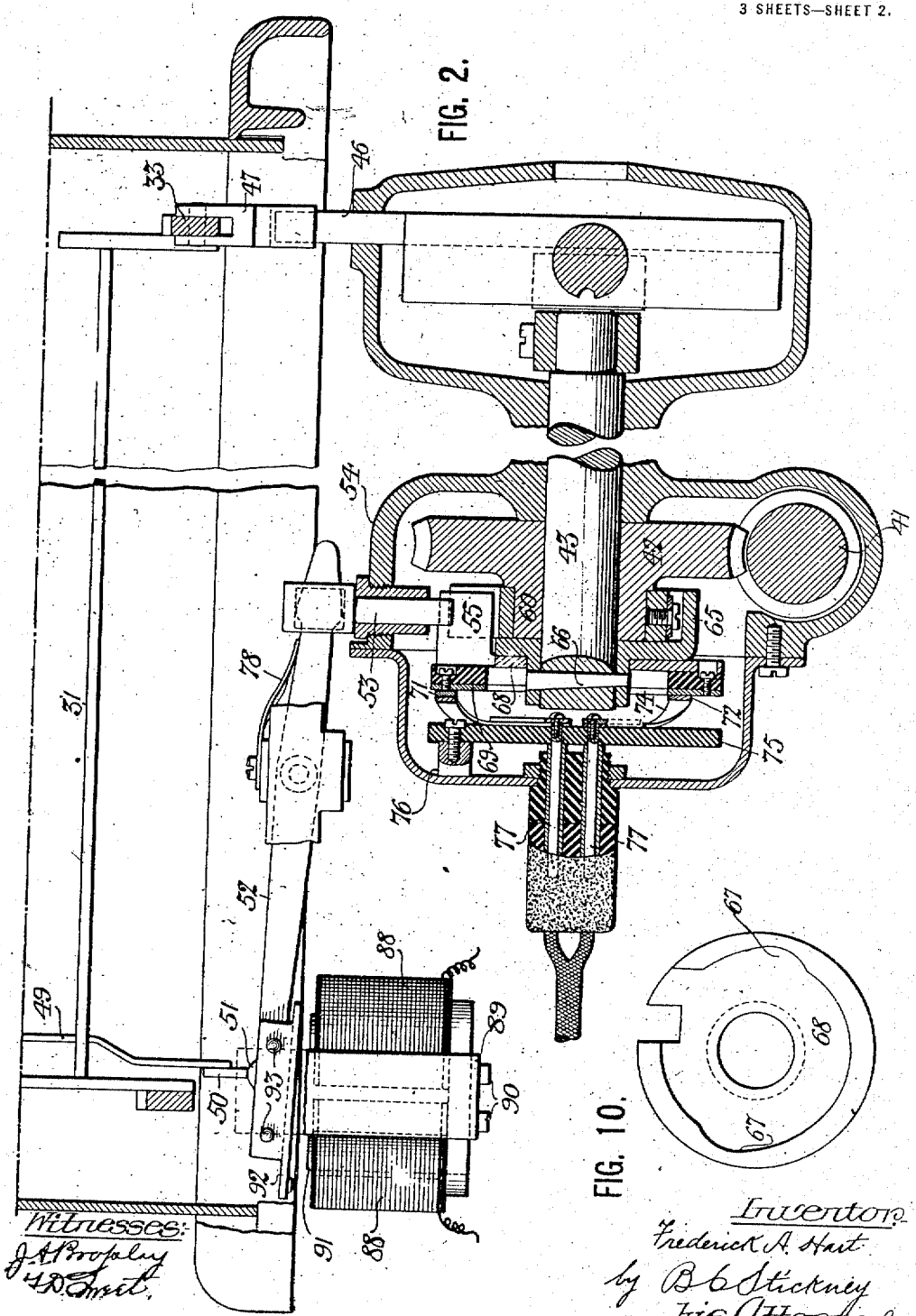

UNITED STATES PATENT OFFICE.

FREDERICK A. HART, OF JERSEY CITY, NEW JERSEY, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,254,627.

Specification of Letters Patent.

Patented Jan. 22, 1918.

Application filed September 18, 1911. Serial No. 649,832.

*To all whom it may concern:*

Be it known that I, FREDERICK A. HART, a citizen of the United States, residing in Jersey City, in the county of Hudson and State of New Jersey, have invented certain new and useful Improvements in Combined Type-Writing and Computing Machines, of which the following is a specification.

My invention relates to computing machines, such for instance as that shown in British Patent No. 3390 of 1912, and disclosed in my application Serial No. 466,836, filed December 10, 1908, and particularly to automatically operated devices for use in starting a motor drive for combined typewriting and computing machines. I have primarily designed it to be used in connection with an intermittently operated electric motor as shown in patent to Thornton, No. 1,146,371, dated July 13, 1915, and to be attached to the combined typewriting and adding machine of the Underwood-Hanson type shown therein.

In this adding machine, the numeral keys of the typewriter are caused to set up pins which are subsequently engaged by a general operator whereby the extent of rotation of the dial or computing wheels of the totalizer is determined. This general operator is actuated by an electric motor, which may be idle, except at the moment when the general operator moves to add into the totalizer the numerals represented by the pins which have been set up. In said copending application the motor automatically stops, and is disconnected from the mechanism, after each movement of the general operator is completed.

My invention comprises automatic means for starting this motor after striking the numeral key which prints the numeral in the units column of the computing device.

In carrying out this invention, I prefer to employ an electric circuit, which actuates an electromagnet, to raise a pin controlling a switch and a clutch between the motor and the general operator.

Certain features of my invention are applicable to other machines in which the motor is otherwise connected to the computing mechanism, and to other uses than for starting motors. Other features and advantages will hereinafter be pointed out, or be obvious to those skilled in the art.

In the accompanying drawings,

Figure 1 is a sectional elevation of an Underwood-Hanson combined typewriting and adding machine, of the kind to which the above improvements are applied.

Fig. 2 is a front elevation, partly in section, of the electromagnet, the motor, and the connections between them.

Fig. 3 is a diagrammatic view of the electromagnet and the contacts for starting the motor.

Fig. 4 is an enlarged view of the electric contacts.

Fig. 5 is an enlarged plan view of the shifting device operated by the carriage.

Fig. 6 is a section through the switch and clutch of the motor when at rest.

Fig. 7 is a section through the same at the moment of starting.

Fig. 8 is a side elevation of a pair of brushes and the device on which they are mounted.

Fig. 9 is a perspective view of a disk used for supporting and operating a rotary bridge.

Fig. 10 is an elevation of the clutch cup shaped ring.

Fig. 11 is a fragmentary section showing the ends of the jacks and the tappet for raising them.

Numeral keys 1, depress levers 2 to operate through bell cranks 3 to throw type bars 4 upwardly and rearwardly to strike on the front of platen 5, which is mounted to travel on a letter-feeding carriage 6, driven in the usual manner by a spring (not shown). This carriage 6 is controlled by letter feeding devices comprising a universal bar 7 actuated by heels 8 on the type bars 4, and forming part of a frame 9, which has vibrating supports 10, and actuates the usual letter feeding dogs 11 to control escapement wheel 12.

Upon said carriage 6 is a tappet or dog 13, which is usually adjustable along the rack bar 14, and has a cam edge to lift successively jacks 15 arranged in a row, mounted on a fulcrum 16. The rear ends 17 of the jacks press down links 18, to vibrate levers 19, which are connected to linkages 20 to elevate the rear ends of a series of bars 21, whose forward ends carry racks 22, meshing with pinions 23 connected to dial wheels 24, whereby the latter may be rotated.

The numeral keys 1 have stems 25, to operate arms 26 fast upon shafts 27, which support linkages 28 on arms 29. These linkages are depressed when arms 26 are depressed, and are adapted to strike any one of a series of pins 30 upon the elevated rack bar 21. As the carriage 6 feeds step by step, the rack bars 21 are elevated in succession, and downwardly from each is projected a pin 30 in the manner just described. The rack bars fall to normal position, thus bringing the depressed pins into the path of a cross bar 31 forming part of a general operator. The general operator, which also comprises a pair of arms 32 and a pair of racks 33 on opposite sides of the machine, is connected by pinions 34 and segments 35 to a shaft 36. After the pins are set up (i. e. depressed) by the numeral keys 1, the general operator moves forward, and the bar 31 of the general operator engages all the depressed pins and drives forward the racks 22 corresponding distances, to turn the dial wheels 24 accordingly. The wheels are not turned on the return stroke, because of a pawl and ratchet connection not shown, but the pins are reset in their original positions ready to be set up for a new number. It will be noted that the bars 31 form members in which numbers are temporarily registered by the depressed pins.

To drive the machine by power, an intermittently operated motor 37 is attached to the adding machine table 38 and is provided with a main shaft 40. Upon shaft 40 is fixed worm 41 turning worm wheel 42 mounted to revolve on shaft 43. Arm 44, fast on shaft 43, carries slide 45 mounted in bar 46. Thus when the motor 37 turns worm 41 and worm wheel 42, if shaft 43 rotates with wheel 42, the arm 44 will rotate about shaft 43, reciprocating the bar 46, on which rests a yoke 47 bolted to the rack 33 of the general operator and the motor will drive said operator forward and back by said yoke.

Key 48 on plunger 49 depresses bar 50 to strike the end 51 of lever 52 to raise pin 53, which controls the clutch and starting switch of motor 37.

Referring now particularly to Figs. 2, 6, 7, 8, 9 and 10, pin 53 extends normally through casing 54, so as to press arm 55 against shoulder 56 of ring 57 said arm thus compressing spring 59. Ring 57 is not fixed to hub 60 of worm wheel 42, but is frictionally engaged therewith by the action of blocks 61 pressed against hub 60 by springs 62 mounted on ring 57 by screw 63. Within sockets 64, of ring 57, rolls 64ª turn freely and are normally out of contact with cup member 65 fixed on shaft 43 by key 66. Cup member 65 has sockets 67 to insure this freedom from contact, but if hub 60 turns counterclockwise slightly, it carries counterclockwise the ring 57 and rolls 64ª to the main part of ring 65 and the jam, thus forcing ring 65 and hub 60 to revolve together, and the combination forms a clutch driving the shaft 43 from worm wheel 42.

Arm 55 is formed as a turned up edge of ring 68 loose on cup member 65. On ring 68 is mounted the conductor ring 69, constituting a rotary bridge having a gap filled by insulation segment 70. Against this ring bear the ends 71 and 72 of brushes 73 and 74 mounted on insulator plate 75 fixed on stud 76 of the casing. Through these brushes the current driving the motor passes from wires 77. There will then be one position of the brushes in which end 71 of brush 73 will bear on the insulator segment 70. In this position, the motor will not be driven, and the parts are so arranged that this is the case when pin 53 is holding arm 55, as shown in Fig. 6. To start the motor the brushes and insulator segment 70 are so set that the withdrawal of pin 53, as shown in Fig. 7, will bring the conductor part of ring 69 over brush 73, thus sending the current through the motor. This carries ring 57 around as above described till the rolls jam, and then the whole clutch revolves.

In actual operation pin 53 is dropped back immediately by the pressure of spring 78 mounted on the main frame and pressing lever 52. The motor continues to drive the machine till arm 55 strikes pin 53, when ring 57 is arrested and rolls 68 no longer bind. Shaft 43 accordingly stops, and current ceases to pass through the motor, though the momentum may keep it revolving independently for a time.

To effect the automatic starting of the motor the following mechanism is used. Fig. 5 is an enlarged plan showing the frame 79 carrying the jacks 15. The last jack to the left bears on a link 18 which extends downward like the other links 18 above described, but carries a lug 80 carrying a pin which rests in fork 81 of bell crank 82, the other end 83 of which carries a spring 84 extending from the main frame, and tending to draw link 18 upward. Beneath the boss of lever 82 is a pin 85 of insulating material resting on electric spring terminal 86 and adapted to press it against another terminal 87 and thus close a leading circuit (see Figs. 3 and 4). A wire 88 is connected to terminal 87 by suitable binding keys and leads to the windings 88 of an electro-magnet supported from the main frame by a U-shaped member 89 held to its yoke by screws 90. Above the cores 91 of the magnet is an armature 92 attached by screws 93 to lever 52 from which the starting pin 53 is hung. There is also preferably included in the electro-magnet leading circuit a battery 94, which may consist of a few dry cells to furnish a low tension current which will not spark.

It will be evident that when the dog 13 is moved along with the typewriter carriage past the units jack, for the last computing or units column of figures, said dog will strike in feeding to the next letter-space, the last or special jack momentarily and depress the pin 85 to close the leading circuit around the magnet. This will draw the armature down, raise the starting pin, and the motor in the main circuit will drive the worm wheel till one stroke of the general operator is finished, thus adding in the numerals just written, and restoring the pins ready to be set for a new number.

Special jack 15 is cut away at 95, Fig. 11, so that it is not held raised, but is only raised momentarily as the carriage in its letter spacing movement carries the tappet 13 from the position of rest when writing in the units column to the next position of rest, or letter space. Thus the link 18 closes the leading circuit just long enough to energize the magnet and thus raise the starting pin. Fig. 11 shows the position of the parts after passing the units jack and striking the special jack.

Variations may be resorted to within the scope of the invention, and portions of the improvements may be used without others.

Having thus described my invention, I claim:

1. A combined typewriting and computing machine having a letter-feeding carriage, computing mechanism, and typewriter numeral keys for indexing numbers to be run into said computing mechanism; and comprising, in combination, a normally ineffective power device for running numbers indexed into said computing mechanism, a device provided with an independent source of power for controlling the effectiveness of said power device and to render the same ineffective on completion of the running in of the numbers indexed, and means connected to said carriage for momentarily acting on said control device at the movement of said carriage on the writing of a numeral in units place.

2. A combined typewriting and computing machine having a letter-feeding carriage, computing mechanism, and indexing mechanism for indexing numbers to be run into said computing mechanism; and comprising, in combination, an electric motor for running numbers indexed into said computing mechanism, a normally open circuit for said motor, normally ineffective connections between said motor and the computing mechanism, a device controlling the effectiveness and ineffectiveness of said motor on the computing mechanism through the medium of said circuit and said connections, an independent source of power for actuating said controlling device, and means brought into action on the writing of a number in units place, for acting on said control device.

3. A combined typewriting and computing machine having computing mechanism, a letter-feeding carriage, means for indexing numbers, and a general operator for running into the computing mechanism the number indexed; and comprising, in combination, a motor for said general operator, means for inciting said motor to action, an electric circuit independent of the motor circuit for acting on said inciting means, and means brought into action on a letter-feeding movement of said carriage, for momentarily closing said independent circuit.

4. The combination with a combined typewriting and computing mechanism, of an operator driving and setting the computing mechanism, a motor driving said operator, a carriage, means on the carriage for controlling the computing mechanism and for controlling the closing of an electric circuit on writing a numeral in a given letter space, a magnet in said circuit, an armature moved by said magnet, and a starting device for the motor operated by said armature.

5. The combination with a combined typewriting and computing mechanism, of an operator driving and resetting the computing mechanism, a motor driving said operator, a carriage, an electric circuit, means on the carriage for controlling the computing mechanism and for controlling the closing of said circuit on writing a numeral in a given letter space, a magnet in said circuit, an armature moved by said magnet, a lever carrying said armature, a pin carried by an arm of said lever, and a switch held by said pin and adapted on its being moved to start said motor.

6. The combination with a combined typewriting and computing mechanism, of a motor driving the computing mechanism, a carriage, numeral keys, letter feeding means for the carriage controlled by said keys, a jack-setting device on the carriage, jacks on the main frame, one for each column of figures recorded by the computing mechanism, a special jack following the jack for the units column of the computing mechanism, a link moved by said special jack, a bell crank supporting said link, a spring cooperating with an arm of said bell crank to support said link, a member moved by said link, an electric circuit closed by said member, a magnet in said circuit, an armature moved by said magnet, a lever supporting said armature, a pin on an arm of said lever, and a starting device for the motor controlled by said pin.

7. The combination with a combined typewriting and computing mechanism, of numeral keys controlling the computing mechanism, a carriage, letter feeding means for the carriage controlled by the keys, jacks supported on the main frame, one for each column of figures recorded by the computing mechanism, a special jack supported on the main frame, a jack moving member on said carriage, a link moved by the special jack, a circuit closed by the link, a magnet energized by the circuit, a motor started by the magnet, an operator driving and resetting the computing mechanism driven by the motor, and means to stop the motor after setting the computing mechanism.

8. A combined typewriting and computing machine having computing mechanism, a letter-feeding carriage, means for indexing numbers, and a general operator for running into the computing mechanism the numbers indexed; and comprising, in combination, a normally inactive motor for said general operator, means for inciting said motor to action, an electric circuit independent of the motor circuit for acting on said inciting means, means brought into action on a letter-feeding movement of said carriage, on writing in units column for momentarily closing said independent circuit, and means dependent upon the operation of the motor for restoring it to normal inactive condition.

9. In a combined typewriting and computing mechanism, numeral keys controlling the computing mechanism, a carriage, letter feeding means for the carriage controlled by the keys, jacks supported on the main frame, one for each column of figures recorded by the computing device, a special jack supported on the main frame, means on the carriage to move the jacks successively by the letter feeding means, a link moved by said special jack, a terminal moved by said link, an electric circuit closed by said terminal, an armature moved by said magnet, a motor, a motor circuit closed by said armature, and means to enable the motor to effect a cycle of operations of the computing mechanism.

10. A combined typewriting and computing machine having computing mechanism, a letter-feeding carriage, means for indexing numbers and a general operator for running into the computing mechanism the numbers indexed; and comprising in combination, a normally inactive motor, means for inciting said motor to action and automatically maintaining the activity thereof through a cycle of operations of the general operator, said inciting means including an independent or leading circuit acting on said inciting means, a jack and means for engaging said jack during a letter-feeding movement of said carriage, said last-mentioned means releasing said jack on completion of said letter-feeding movement whereby said leading circuit is but momentarily closed.

11. A combined typewriting and computing machine having computing mechanism, a letter-feeding carriage, means for indexing numbers and a general operator for running into the computing mechanism the numbers indexed; and comprising in combination, a normally inactive motor, means for inciting said motor to action and automatically maintaining the activity thereof through a cycle of operations of the general operator, said inciting means including an independent or leading circuit acting on said inciting means, a jack having a full portion and a cut-away portion and means for engaging said jack at its full portion, during a letter-feeding movement of said carriage to close said leading circuit, said last mentioned means passing to said cut-away portion on completion of said letter feeding movement whereby said leading circuit is but momentarily closed.

12. In a combined typewriting and computing machine, the combination with a letter-feeding carriage and indexing devices for setting up numbers, of a computing mechanism into which they are later carried from said indexing devices, means for operating said mechanism comprising a motor and an electric circuit therefor, means controlled by a letter-feeding movement of said carriage for automatically closing said circuit, automatically connecting said motor to the computing mechanism, for automatically keeping said circuit closed during a cycle of operations of said computing mechanism and for automatically disconnecting said motor and opening the circuit.

13. In a combined typewriting and computing machine, the combination with members in which numbers are temporarily registered, of a computing mechanism into which they are carried from said members, a motor for so carrying said numbers, a normally-open circuit for driving said motor, a leading circuit, controlling means for momentarily closing the leading circuit, thereby to close the first-named circuit and start said motor, means independent of said controlling means for holding said first-named circuit closed until said motor completes its work, and for automatically opening the circuit and restoring it to condition for closing by said controlling means.

14. A combined typewriting and computing machine having computing mechanism, a letter-feeding carriage, means for indexing numbers and a general operator for running into the computing mechanism the numbers indexed; and comprising in combination, a motor for said general operator, a normally open circuit for said motor and a second circuit momentarily closed at letter-feeding movement of said carriage, means enabling said second circuit to close said first-named circuit and start said motor, said last-named circuit being held closed while said motor completes its work.

15. A combined typewriting and computing machine having a letter-feeding carriage, computing mechanism, and indexing mechanism for indexing numbers to be run into said computing mechanism; and comprising, in combination, a normally ineffective power device for running into said computing mechanism the numbers indexed, a device for controlling the effectiveness of said power device, and to render the same ineffective on said computing mechanism on the completion of the running in of numbers indexed, a manual means for directly acting on said control device, an electric circuit normally open, and means brought into action on a letter-feeding movement of said carriage and acting on said control device through the medium of said electric circuit.

16. A combined typewriting and computing machine having a letter-feeding carriage, computing mechanism, and indexing mechanism for indexing numbers to be run into said computing mechanism; and comprising, in combination, a normally ineffective power device for running into said computing mechanism the numbers indexed, a device for controlling the effectiveness of said power device, and to render the same ineffective on said computing mechanism on the completion of the running in of numbers indexed, a lever for operating said control device, a normally open circuit for operating said lever, and means brought into action on a letter-feeding movement of said carriage for momentarily closing said circuit.

17. A combined typewriting and computing machine having computing mechanism, a letter-feeding carriage, typewriter numeral keys for indexing numbers, and a general operator for running into the computing mechanism the numbers indexed; and comprising, in combination, a motor for driving said general operator, and means controlling said motor, comprising a clutch-member, means for holding it against starting, a normally open circuit for said motor, and means brought into action on writing in units column for moving said holding means to close said clutch and said circuit.

18. In a combined typewriting and computing machine, the combination with a traveling carriage and a jack operated thereby, of two spaced electric terminals brought into contact by and then automatically released from the control of said jack, electro-magnetic means energized by the contact of said terminals, a clutch comprising normally spaced terminals, a pin normally holding said terminals spaced but moved by said electro-magnetic means to bring said clutch terminals into contact, a motor, computing mechanism connected by said clutch to said motor, the movement of said motor restoring said terminals and clutch to normal position at the completion of the operation of the computing mechanism by said motor.

19. A combined typewriting and computing machine having typewriter numeral keys, computing mechanism, devices for indexing numbers under control of said keys, and a general operator for running the numbers indexed into said computing mechanism; and comprising, in combination, a motor for said general operator, a normally open circuit for said motor, a normally open clutch between said motor and said general operator, controlling mechanism brought into action at the writing of a number in units place for first closing and then releasing the control of said circuit and said clutch, and means independent of said controlling mechanism for automatically opening said circuit and said clutch.

20. A combined typewriting and computing machine having typewriter numeral keys, computing mechanism, and devices for indexing numbers under control of said keys; and comprising, in combination, a motor for running into the computing mechanism the number indexed, a normally open circuit for said motor, a normally ineffective connection between said motor and said computing mechanism, controlling means brought into action at the writing of a number in units place for closing said circuit and rendering said connection effective during a computation, said controlling means also acting automatically at the completion of the computation to open said circuit and render said connection ineffective.

21. In a combined typewriting and computing machine, the combination with typewriter keys for setting up numbers, of a computing mechanism into which they are carried, a motor normally ineffective and normally disconnected from said computing mechanism, and automatic means first started from and then released by any of said keys on writing in units column acting to successively control the starting of the motor, its connection with the computing mechanism, its stopping, its disconnection from said computing mechanism, and its restoration to position to be started by said keys.

22. In a combined typewriting and computing machine, the combination with typewriter keys for setting up numbers and a letter-feeding carriage controlled by said keys, of a computing mechanism into which said numbers are carried, a motor normally ineffective and normally disconnected from said computing mechanism, and automatic means first started from and then released by any of said keys and acting through the medium of said carriage to successively control the starting of the motor, its connection with the computing mechanism, its stopping, its disconnection from said computing mechanism, and its restoration to position to be started by said carriage.

23. In a recording computing machine, the combination with numeral keys and computing wheels, of normally disconnected devices by which numbers set up by said keys are later carried into said computing wheels, a motor for driving said devices, a circuit for said motor normally open, means dependent upon the setting up of a digit in the units place for automatically connecting said motor to said devices and closing said circuit driving said motor, and means independent of said carriage but dependent upon the operation of said motor for disconnecting it and opening said circuit at the completion of the cycle of operation of the computing devices.

24. In a combined typewriting and computing machine, the combination with keys for setting up numbers, of a computing mechanism into which they are carried, a motor normally inactive and normally disconnected from said computing mechanism, and automatic means called into action by any of said keys acting to successively control the starting of the motor, its connection with the computing mechanism, its disconnection from the control of said keys, its stopping, its disconnection from said computing mechanism, and its restoration to the control of said keys.

25. In a computing machine, the combination with numeral keys and computing wheels, of devices by which numbers set up by said keys are later carried into said computing wheels, a motor for driving said devices, a circuit for said motor normally open, mechanism brought into action by any of said keys for automatically connecting said motor to said devices, closing the circuit driving said motor, and disconnecting the motor from the control of said keys, and means included in said mechanism effective at the completion of the cycle of computing operations for opening the motor circuit, disconnecting the connecting devices between the motor and the computing devices, and restoring the motor to condition to be controlled by said keys.

26. In a combined typewriting and computing machine, the combination with a traveling carriage, of numeral keys, devices operated thereby for letter-feeding said carriage, computing wheels, devices by which the numbers set up by said keys are later run into said computing wheels, a motor for driving said running in devices, mechanism acting through said carriage and brought into action by any of said keys for automatically connecting said motor to said running in devices, and for closing the circuit driving said motor, and means included in said mechanism effective at the completion of the cycle of computing operations for opening the motor circuit, disconnecting the connecting devices between the motor and the computing devices, and restoring the motor to condition to be controlled by said carriage.

27. In a combined typewriting and computing machine, the combination with computing mechanism and a traveling carriage, of a motor for driving the computing mechanism, a circuit wherein said motor is included, a contact in said circuit, a starting disk, a member normally holding said disk against starting, means under the control of the carriage for disengaging said member to permit said disk to start, and then releasing said member, and means brought into action by the starting of said disk to close said circuit, and to enable the motor to drive the computing mechanism, and finally to open said circuit, disconnect the motor from the computing mechanism, and to restore the control of the carriage.

28. In a combined typewriting and computing machine, the combination with computing mechanism, a traveling carriage and letter-feeding devices for said carriage, of a motor to drive the computing mechanism, a motor circuit, a contact therein, a starting disk having an insulation segment normally engaging said contact, and a conducting portion brought into engagement with said contact by the starting of said disk to close said motor circuit, a member normally holding said disk against starting, an electro-magnet, a magnet circuit, an armature associated with said magnet and connected to release said holding member when said magnet is energized to permit said disk to start, means under the control of the carriage during letter-feeding movement for closing said magnet circuit, said closing means being automatically released from the control of said carriage, said holding member effective on said disk at the completion of the computing operation to open the motor circuit and restore it to its normal condition of being controllable by said carriage.

29. A combined typewriting and computing machine having typewriter numeral keys, computing mechanism, and devices for indexing numbers under control of said keys; and comprising, in combination, a motor for running into the computing mechanism the number indexed, a normally open circuit for said motor, a normally ineffective connection between said motor and said computing mechanism, and means brought into action at the writing of a number in units place for closing said circuit and rendering said connection effective, said circuit being opened and said connection being rendered ineffective automatically at the completion of the running in of numbers.

FREDERICK A. HART.

Witnesses:
PAUL ZIRON,
GLENFIELD S. YOUNG.